United States Patent
Eicher

(10) Patent No.: US 7,219,597 B2
(45) Date of Patent: May 22, 2007

(54) DEVICE FOR LETTING OFF RESIDUAL STEAM AND WATER FROM THE HEATING UNIT OF A HOT BEVERAGE MACHINE

(75) Inventor: Heinz Eicher, Jona (CH)

(73) Assignee: Eugster/Frismag AG, Romanshorn (CH)

( * ) Notice: Subject to any disclaimer, the term of this patent is extended or adjusted under 35 U.S.C. 154(b) by 422 days.

(21) Appl. No.: 10/812,068

(22) Filed: Mar. 30, 2004

(65) Prior Publication Data
US 2004/0177760 A1  Sep. 16, 2004

Related U.S. Application Data

(63) Continuation of application No. 10/697,569, filed on Oct. 31, 2003, now abandoned.

(30) Foreign Application Priority Data
Nov. 4, 2002  (DE) ............................ 202 17 068 U

(51) Int. Cl.
*A47J 31/54*  (2006.01)
*A47J 31/30*  (2006.01)
(52) U.S. Cl. .......................... 99/293; 99/302 R; 99/290
(58) Field of Classification Search ................. 99/293, 99/294, 302 R, 279, 288, 290, 323.1

See application file for complete search history.

(56) References Cited

U.S. PATENT DOCUMENTS

| 4,361,750 A | * | 11/1982 | Miklas | 392/471 |
| 5,302,407 A | | 4/1994 | Vetterli et al. | |
| 5,842,407 A | * | 12/1998 | Schmed | 99/290 |
| 6,019,028 A | * | 2/2000 | Schmed | 99/293 |
| 6,161,469 A | * | 12/2000 | Rolla | 99/293 |

FOREIGN PATENT DOCUMENTS

| DE | 42 08 854 | 9/1993 |
| DE | 195 26 593 | 1/1997 |
| DE | 195 49 227 | 7/1997 |
| EP | 0853909 A | 7/1998 |
| GB | 944653 A | 12/1963 |
| GB | 2367550 A | 10/2002 |

* cited by examiner

*Primary Examiner*—Reginald L. Alexander
(74) *Attorney, Agent, or Firm*—Venable LLP; Robert Kinberg; Ryan M. Flandro

(57) ABSTRACT

A hot beverage machine includes a heating unit having a fresh water intake. A fresh water line supplies fresh water to the fresh water intake of the heating unit. A residual fluid line is coupled to the fresh water intake of the heating unit through an on-off valve for conducting fluids to a collection container. A device for letting off residual steam and residual water from the heating unit includes a heat-exchanging and heat-storing condenser having a residual line section coupled to the residual fluid line, a fresh water line section coupled into the fresh water line and a heat storing medium that is connected for conducting heat between the residual line section and the fresh water line section.

12 Claims, 2 Drawing Sheets

DEVICE FOR LETTING OFF RESIDUAL STEAM AND WATER FROM THE HEATING UNIT OF A HOT BEVERAGE MACHINE

CROSS-REFERENCE TO RELATED APPLICATION

This application is a continuation of U.S. application Ser. No. 10/697,569, filed Oct. 31, 2003, now abandoned, and claims the priority of German Patent Application No. 202 17 068.3 filed Nov. 4, 2002, which was also claimed in the parent application. The subject matter of both foregoing applications is incorporated herein by reference.

BACKGROUND OF THE INVENTION

The invention relates to a device for letting off residual steam and residual water from the heating unit of a hot beverage machine, for example a coffee machine.

With known fluid systems in coffee machines and other hot beverage machines, it is generally desirable to remove any residual water in the heating unit which remains after the coffee extraction or the hot water release. Once the machine is turned off, such residual water is vaporized into steam as a result of existing residual heat or is present in the form of residual water and/or flash water, and is allowed to collect in a collection container that is generally installed inside the coffee machine. The same steps are taken if, following the process of generating steam to supply to a steam nozzle or a frothing nozzle, the heating unit is cooled down with fresh water until it reaches a temperature for preparing coffee. That is to say, unused steam and, if necessary, hot water are also released into the collection container. The steam generated during this operation is also referred to as residual steam or flash steam since its pressure is reduced as compared to the steam generated during the operation, in particular through opening a residual fluid line and shutting down a water pump which otherwise pumps fresh water into the heating unit that is typically designed as a flow-through heating unit.

A corresponding device, known from practical operations, for letting off residual steam, comprises a residual fluid line which is connected via an on-off valve to the heating unit, so as to conduct fluids, and which leads to a collection container in the coffee machine. The disadvantage of this device is that some of the residual steam within the coffee machine can escape uncontrolled and can thus affect components inside the coffee machine, particularly the electronic components. These components can be damaged and/or can fail completely and undesirable micro-biological cultures can form even faster. The removal of the residual steam and residual water outside of the housing generally was not planned because of the related danger of scalding.

SUMMARY OF THE INVENTION

Thus, it is an object of the present invention to remove the residual steam in a hot-beverage machine, particularly in a coffee machine of the aforementioned type, such that the components inside the hot-beverage machine are not damaged and micro-biological cultures cannot form faster as a result of the supplied moisture.

The above and other objects are accomplished according to the invention by the provision of a hot beverage machine, comprising: a heating unit having a fresh water intake; a fresh water line for supplying fresh water to the fresh water intake of the heating unit; an on-off valve; a residual fluid line coupled to the fresh water intake of the heating unit through the on-off valve for conducting fluids to a collection container; and a device for letting off residual steam and residual water from the heating unit, comprising a heat-exchanging and heat-storing condenser having a residual line section coupled to the residual fluid line, a fresh water line section coupled into the fresh water line and a heat storing medium that is connected for conducting heat between the residual line section and the fresh water line section.

With this device, the residual steam generated in the heating unit following the release of hot water and/or brewing water and/or steam for the beverage and/or coffee, as well as the residual water generated in the steam-expansion phase in which the on-off valve is opened, is not directly guided via this valve and the residual fluid line into a collection container in the hot-beverage machine. Rather the residual water and steam are guided via a residual fluid line section into a heat-exchanging and heat-storing condenser. There, the residual steam is sufficiently cooled down, such that it condenses and runs in a watery phase into the collection container. The heat released in the process by the residual water and the residual steam, in particular the condensation heat, is absorbed by the heat-storing condenser. During the subsequent feeding of fresh water into the heating unit, the fresh water flows through a fresh-water line section that is inserted into the fresh-water line and is a component of the heat-exchanging and heat-storing condenser in the same way as the residual fluid line section. As a result, the fresh water pumped through the fresh-water section absorbs heat from the heat-exchanging and heat-storing condenser and can be heated up to the desired temperature and/or can be vaporized in the heating unit with less energy expenditure. In the process, the condenser is cooled to a temperature that is sufficiently low for condensing the residual steam.

The process has several advantages. The residual steam in the residual fluid line is not supplied in the form of steam to the hot-beverage machine, following the opening of the on-off valve, and an uncontrolled precipitation of moisture is avoided. The safety of the hot-beverage machine is increased. On the other hand, the heat removed from the residual water and the residual steam, in particular through condensation, is used to preheat the fresh water which is subsequently heated further and if necessary is vaporized in the heating unit with a correspondingly reduced amount of energy. In particular, a portion of the extraction heat necessary for preparing coffee can be provided through preheating the fresh water. The required apparatus expenditure basically requires only an additional heat-exchanging and heat-storing condenser.

A thermal equilibrium between heating-up and cooling-down of the condenser is preferably achieved with a sequential control of respectively one fresh-water supply for the heating unit. For this purpose, a water pump is installed in the fresh-water line and is switched on to pump fresh water through the fresh-water line section to the heating unit and further via a pressure-control valve installed in a discharge line of the heating unit which opens with the operating pressure of the water pump. During a respectively following flash-expansion process because the water pump is shut down and the on-off valve is opened, residual steam and residual water are caused to flow through the on-off valve from the heating unit through the residual fluid line section. The object of the invention is furthermore achieved through dimensioning the heat-exchanging and heat-storing condenser so that during several fresh-water intakes, respectively interrupted by flash expansion processes, a thermal equilibrium adjusts for the heat-exchanging and heat-storing condenser during which the residual steam in the residual fluid line section is essentially condensed completely during the flash expansion process. The condenser material and mass in this case are designed so that the condensation effect is maintained during the flash expansion process, even within the framework of an intensive release of coffee. The on-off valve as well as the water pump preferably can be synchronized for this operation.

Instead, it is also possible to control the switching operations so as to be sequential and independent of each other, for example if steam must be generated in the quickest possible way and with the lowest amount of energy, e.g. twice in a row, for the cappuccino preparation. In that case, the steam in the heating unit is not expanded due to expansion between the two steam-generating operations, but only following the second steam-generating operation.

The components used in the known device for removing residual steam and residual water can for the most part be used to realize the device according to the invention. In connection with the heat-exchanging and heat-storing condenser, these components can be used to optimize the heat exchange with the residual water vaporized into steam in the heating unit and the residual water that remains in the watery phase, as well as the fresh water subsequently supplied to the heating unit.

For this, the residual fluid line can be branched off upstream of the pressure-control valve from the fresh-water intake of the heating unit or its discharge line with the aid of an on-off valve and can thus optimally affect the residual fluid line section of the condenser, depending on the design and arrangement of the heating unit, meaning during the steam expansion phase when the on-off valve is opened.

According to a further aspect of the invention, the on-off valve is constituted by a magnetic valve which permits an easy timed control.

According to another aspect of the invention, the condenser simply consists of a heat-conducting and heat-storing block of material, in which the residual fluid line section and the fresh-water line section are installed.

With respect to production, it is advantageous if the heat-storing block is composed of aluminum, with an integrally cast fresh-water line section in the form of a chromium-steel pipe. The chromium-steel pipe prevents a migration of the water through the aluminum.

From a production point of view, it is furthermore advantageous to design the condenser with the feature that the block is divided parallel to a plane containing the residual fluid line section, such that the residual fluid line section is exposed in one of the two parts, with the parts of the block being at a distance to each other. The residual fluid line section therefore can simply be formed into the surface of one part of the block.

A compact design of the block is furthermore made possible if the fresh-water line section and the residual fluid line section are arranged one above the other in two parallel planes. A good heat exchange can thus be achieved between the residual fluid line section and the fresh-water line section. For the latter purpose, the residual fluid line section and the fresh water line section preferably have parallel wavy or meandering line sections in the capacitor block.

The heating unit is preferably designed as flow-through heating unit. The residual water that initially remains in the flow-through heating unit after water is heated and/or steam generated with the water used for the beverage preparation is then vaporized into residual steam by the residual heat remaining in the flow-through heating unit. The residual steam can escape at the fresh-water intake of the flow-through heating unit and can be supplied to the capacitor.

BRIEF DESCRIPTION OF THE DRAWINGS

In the following, the invention is explained with the aid of a drawing including two Figures, which show additional advantageous features and effects.

DETAILED DESCRIPTION OF THE DRAWINGS

Figure 1:
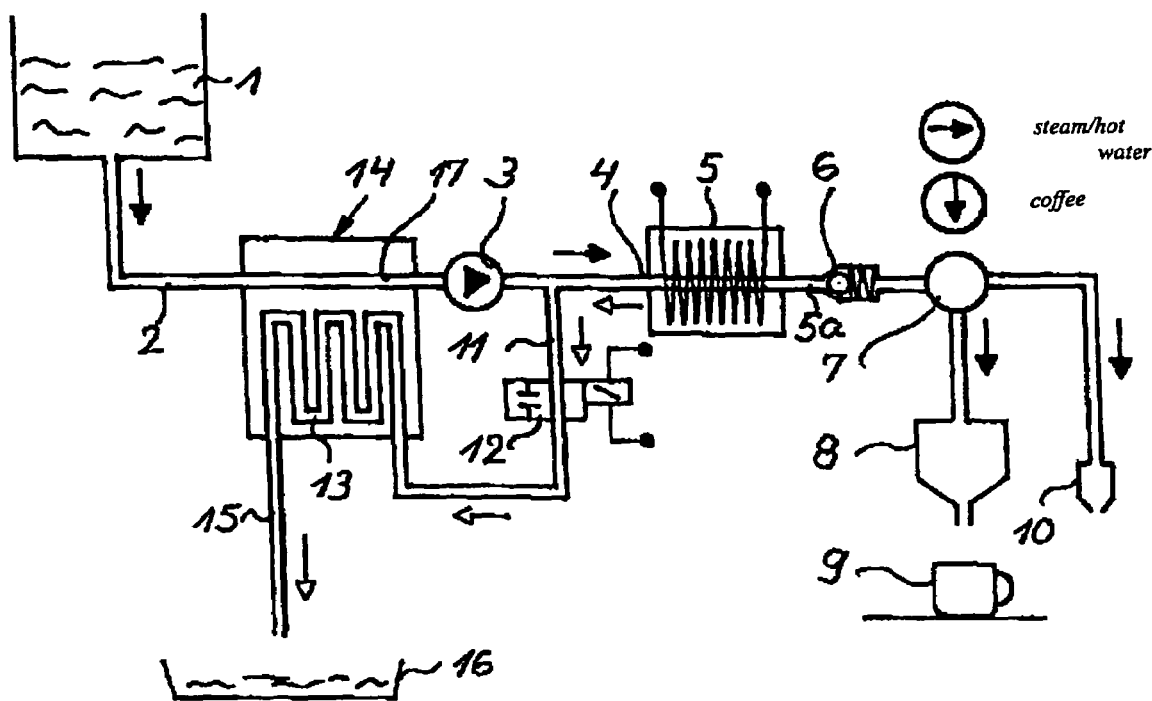
FIG. 1 is a schematic representation of a device for letting off residual steam and residual water from a heating unit inside a coffee machine.

Referring to FIG. 1, there is shown a fresh-water container 1 that contains cold fresh water. A fresh water line 2 runs from container 1 via a water pump 3 to a fresh-water intake 4 of a heating unit 5, which may be, for example, a flow-through heating unit. A discharge line 5a of heating unit 5 is connected via an excess-pressure valve 6 in the form of a spring-loaded ball valve to a selection switch 7, which leads on the one hand to a brewing head 8 of a coffee machine, below which a coffee cup 9 is indicated, and on the other hand to a frothing valve and/or a steam valve 10 which can release steam or hot water. The selection switch 7 settings that must be selected for the coffee or steam generation are shown symbolically in the drawing.

A residual fluid line 11 with therein installed on-off valve 12 in the form of a magnetic valve branches off from the fresh-water intake 4, positioned low, for removing residual steam and residual water from the heating unit 5. The residual fluid line 11 leads to a residual fluid line section 13 of a heat-exchanging and heat-storing condenser 14 while a discharge line 15 on the residual fluid line section 13 empties into a collection container 16, designed as condensate collection container 16, which can be installed inside a coffee machine housing.

A fresh water section 17 that is inserted into the fresh water line 2 essentially completes the condenser 14.

Figure 2:
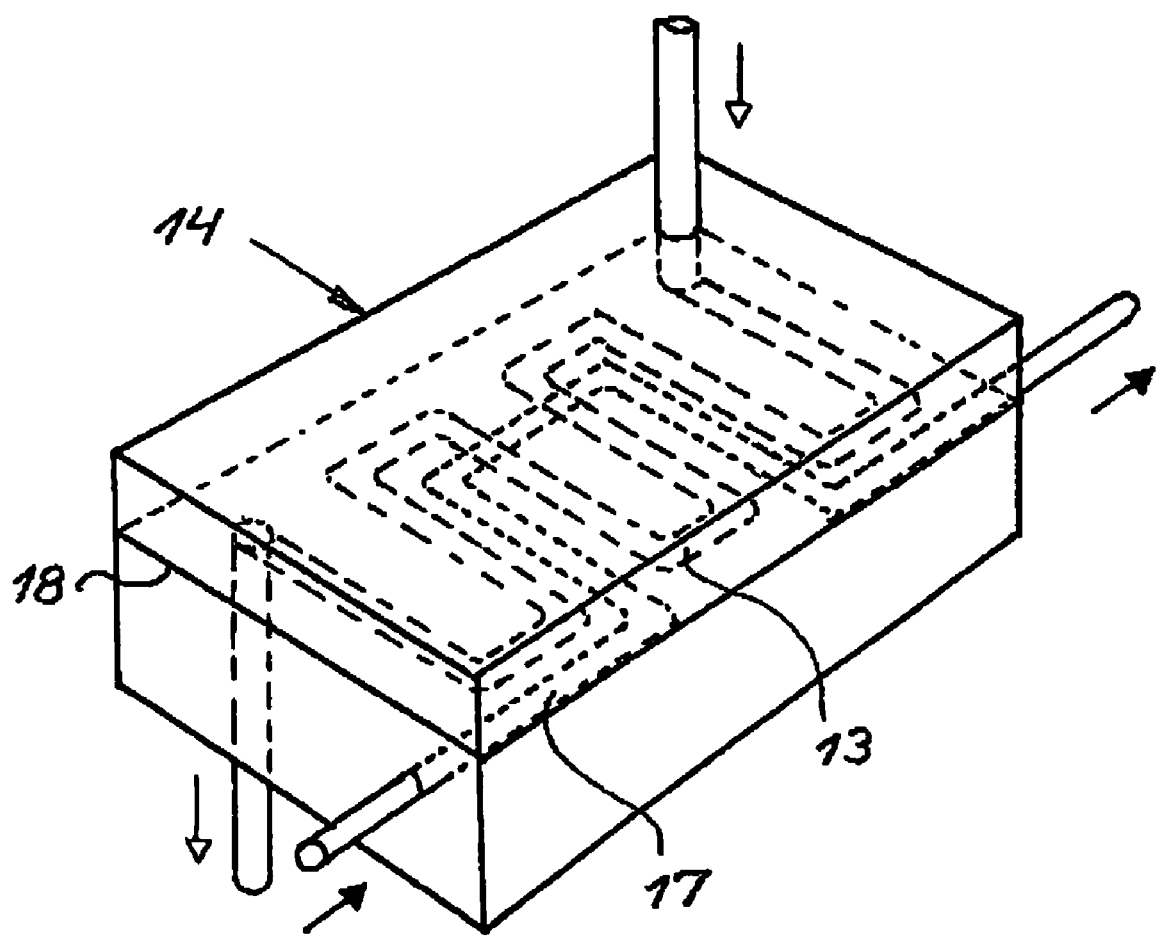
FIG. 2 shows an enlarged detail of FIG. 1, namely an illustration of a heat-exchanging and heat-storing condenser.

FIG. 2 shows details of the heat-exchanging and heat-storing condenser 14. The condenser 14 basically consists of a non-designated block of aluminum that is divided into two parts and contains the meander-shaped residual fluid line section 13 formed in one plane as well as the meander-shaped fresh water section 17 formed in the plane below. In a parallel plane 18, the block is divided into two parts, so that the residual fluid line section 13 can be worked easily from above into the lower part of the block. The upper part of the block on the other hand can be smooth on the underside. The fresh water line section in the form of a chromium-steel pipe and/or stainless steel pipe is incorporated into the lower part of the block. FIG. 2 shows that the residual fluid line section 13 and the fresh water line section 17 extend parallel in some sections and have good heat-conducting contact with the surrounding aluminum material of the block, the heat capacity of which is used for the condenser function.

The pressure-control valve 6 at the output of the heating unit 5 is dimensioned in such a way that it automatically opens the outlet to the fresh water line section 17 if a minimum pressure equaling the water pump 3 operating pressure is exerted onto the valve, which continues through the heating unit 5 designed as flow-through heating unit. The pressure can increase further in this unit as a result of the steam-generating processes. If the water pump 3 is turned off, on the other hand, the pressure-control valve 6 is closed, even if residual steam forms in the flow-through heating unit as a result of residual heat.

Switching contacts that are not shown herein function to operate the water pump 3 and the on-off valve 12 and can be activated such that either the on-off valve 12 is opened or the water pump 3 pumps water to the heating unit 5. For the preparation of coffee or—in another position of the selection switch 7—of steam and hot water, cold fresh water is pumped through the fresh water line 2 and the fresh water line section 17 into the fresh water intake 4 of the heating unit 5 by the water pump 3, which is turned on depending on the required amount of fresh water. The water is heated up in the heating unit or steam is generated and is released through the opened pressure-control valve 6 as brewing water or into the brewing head 8 or as steam and/or hot water into the frothing valve 10. The on-off valve 12 is closed for this, so that the residual fluid line section 13 of the condenser 14 is not admitted with the fresh water during the fresh-water intake of the heating unit 5. The water pump 3 is turned off only after the brewing operation and/or the frothing operation is completed and the on-off valve 12 is opened simultaneously. Since the operating pressure of the water pump 3 is removed, the pressure-control valve 6 closes and the residual steam and the residual water forming in the heating unit 5 as a result of the residual heat flow through the residual fluid line 11 and the on-off valve 12 into the residual fluid line section 13 of the condenser in which the residual steam is cooled down and condensed and where the residual water can also release heat. The condensation water flows through the discharge line 15 into the collection container 16. The heat stored temporarily in the condenser 14 through the cooling and in particular the condensation of the residual steam can heat up the fresh water pumped through the fresh-water line section 17 during a subsequent restart of the water pump 3 and closing of the on-off valve 12, wherein the heat-exchanging and heat-storing condenser 14 simultaneously cools down. The heated fresh water is supplied to the fresh water intake 4 of the heating unit 5. Less energy must therefore be supplied in the heating unit 5 for heating up the fresh water to the desired temperature and/or to the coffee extraction temperature or for generating steam than is the case when cold fresh water is supplied to the heating unit. The device comprising the condenser 14, the control unit for the water pump 3 and the on-off valve 12 are designed such that a sufficiently low temperature equilibrium adjusts in the condenser 14 to maintain the condensation effect during the steam expansion processes where residual steam and residual water enter the residual fluid line section 13 even if a large amount of coffee is dispensed.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

LIST OF REFERENCE NUMBERS 1. fresh water container
2. fresh water line
3. water pump
4. fresh water intake
5. heating unit
5a. discharge line
6. pressure-control valve
7. selection switch
8. brewing head
9. coffee cup
10. frothing nozzle
11. residual fluid line
12. on-off valve
13. residual fluid line section
14. heat-exchanging and heat-conducting condenser
15. discharge line
16. collection container
17. fresh water line section
18. plane

What is claimed is:

1. A hot beverage machine, comprising:
   a heating unit having a fresh water intake;
   a fresh water line for supplying fresh water to the fresh water intake of the heating unit;
   an on-off valve;
   a residual fluid line coupled to the fresh water intake of the heating unit through the on-off valve for conducting fluids to a collection container; and
   a device for letting off residual steam and residual water from the heating unit, comprising a heat-exchanging and heat-storing capacitor having a residual line section coupled to the residual fluid line, a fresh water line section coupled into the fresh water line and a heat storing medium that is connected for conducting heat between the residual line section and the fresh water line section.

2. The machine according to claim 1, wherein the heating unit has a discharge line coupled to the fresh water intake of the heating unit, and further comprising:
   a fresh water pump arranged in the fresh water line for pumping fresh water through the fresh water line section of said device to the heating unit; and
   a pressure control valve coupled into the discharge line of the heating unit, the pressure control valve being operative for opening with the operating pressure of the water pump and closing when the water pump is shut down, resulting in a cooling through steam expansion, the on-off valve being opened when the pressure control valve is closed thereby causing residual steam and residual water to flow through the residual fluid line section of said device.

3. The machine according to claim 2, wherein the heat exchanging and heat storing capacitor is dimensioned so that following several fresh water intakes, respectively interrupted by a steam expansion process, a thermal equilibrium of the heat-exchanging and heat-storing capacitor adjusts, wherein the residual steam in the residual fluid line section is essentially condensed completely during each cooling through steam expansion.

4. The machine according to claim 1, wherein the residual fluid line branches off from the fresh water intake of the heating unit through the on-off valve.

5. The machine according to claim 2, wherein the on-off valve and the water-pump are switchable at the same time.

6. The machine according to claim 1, wherein the on-off valve comprises a magnetic valve.

7. The machine according to claim 1, wherein the heat-exchanging and heat-storing capacitor comprises a block of heat-conducting and heat-storing material in which the residual fluid line section and the fresh water line section are arranged.

8. The machine according to claim 7, wherein block comprises aluminum and the fresh water line section comprises chromium steel pipe, integrally cast into the block.

9. The machine according to claim 7, wherein the residual fluid line section is contained in a plane and the block is divided into parts parallel along said plane so that the residual fluid line section is exposed in one of the two parts.

10. The machine according to claims 7, wherein the residual fluid line section and the fresh water line section extend in two parallel planes, arranged one above the other, in the capacitor block.

11. The machine according to claim 1, wherein the residual fluid line section and the fresh water line section are arranged parallel in the form of meandering line sections inside the capacitor block.

12. The device according to claim 1, wherein the heating unit comprises a flow-through heating unit.

* * * * *